J. W. COOPER.
FRUIT AND POTATO GATHERER.
APPLICATION FILED NOV. 14, 1914.

1,212,909.

Patented Jan. 16, 1917.

Inventor
James Witherspoon Cooper

Witnesses

By

Attorney

UNITED STATES PATENT OFFICE.

JAMES WITHERSPOON COOPER, OF MAYESVILLE, SOUTH CAROLINA.

FRUIT AND POTATO GATHERER.

1,212,909.　　　　Specification of Letters Patent.　　Patented Jan. 16, 1917.

Application filed November 14, 1914.　Serial No. 872,223.

*To all whom it may concern:*

Be it known that I, JAMES W. COOPER, of Mayesville, in the county of Sumter and State of South Carolina, have invented certain new and useful Improvements in Fruit and Potato Gatherers; and I do hereby declare the following to be a full, clear, and exact description of the invention, such as will enable others skilled in the art to which it appertains to make and use the same.

The primary object of this invention is to provide an extremely simple and inexpensive tool for gathering fruit and vegetables from the ground, thereby avoiding the necessity of stooping; and a further object is to enable a single tool to be employed for gathering articles of different sizes.

Figure 1:
Figure 1:
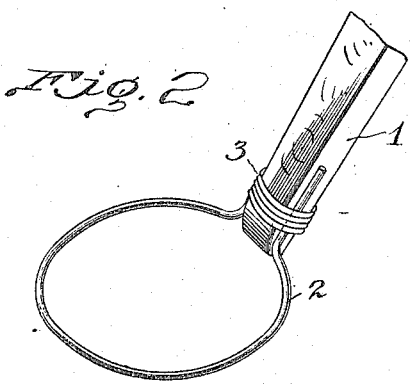
Figure 1:
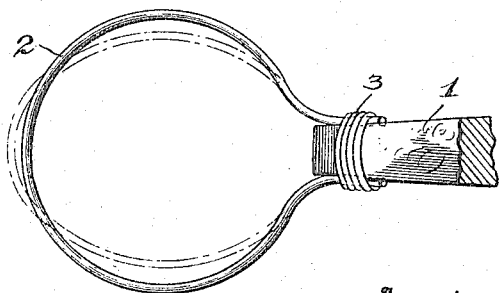

In the accompanying drawings, Figure 1 is a view in perspective. Fig. 2 is a similar view with a portion of the handle broken away. Fig. 3 is a plan view.

Referring to the drawings, 1 designates a shaft or handle of about the length of a cane or umbrella; and 2 the fruit or vegetable engaging and supporting member secured to the lower end of the handle. This member occupies a position at nearly right angles to the handle so that by moving the latter in such a manner as to place one side of the supporting member partly beneath the articles, by a slight movement of the handle the fruit or vegetable will be caused to rest on the member and may then be raised from the ground without the necessity of stooping on the part of the operator.

I preferably form the supporting member of a single continuous wire the ends of which are secured to the opposite longitudinal edges of the handle by any suitable means, as, for instance, by an encircling binder 3. This wire is also sufficiently flexible so that an operator may readily bend it (see dot and dash lines Fig. 3) to shorten the diameter at any point thus altering the shape, so that the tool may be employed for lifting fruit or vegetables of different sizes. In Fig. 3 I have shown the supporting member in circular form in full lines and of elliptical shape in dot and dash lines.

It will be apparent that in its normal position the device may be used to gather fruit above a certain size, smaller specimens falling through the opening of the support. After the larger crop is picked the support is easily bent to pick up the next desired size.

I claim as my invention:

A device for selecting and lifting fruit from the ground comprising a handle, and a flexible wire loop at one end of said handle arranged in a plane angular to the longitunal axis of said handle, the ends of said loop being bent parallel to and secured to the handle, said loop being designed to be bent into different shapes to hold and lift fruit of different sizes.

In testimony whereof, I have signed this specification in the presence of two subscribing witnesses.

JAMES WITHERSPOON COOPER.

Witnesses:
　A. H. MAYES,
　GEO. C. WARREN.

Copies of this patent may be obtained for five cents each, by addressing the "Commissioner of Patents, Washington, D. C."